United States Patent Office 2,807,609
Patented Sept. 24, 1957

2,807,609
DISAZO-DYESTUFFS

Jacob Danuser, Arlesheim, and Hans-Luzi Schucan, Bettingen, Switzerland, assignors to Ciba Limited, Basel, Switzerland, a Swiss firm No Drawing. Application December 12, 1955,
Serial No. 552,291

Claims priority, application Switzerland September 29, 1953

6 Claims. (Cl. 260—176)

This is a continuation in part of our copending application Serial No. 456,872, filed September 17, 1954 (now abandoned).

This invention relates to new disazo-dyestuffs which are free from water solubilizing groups and correspond to the formula (1)
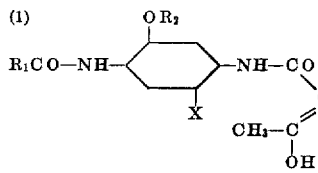

in which $R_1CO-$ represents the radical of a low molecular aliphatic carboxylic acid, $R_2$ represents a low molecular alkyl group, X represents a member selected from the group consisting of a halogen and a low molecular alkoxy group, and U represents a member selected from the group consisting of a halogen atom, a methyl group and a low molecular alkoxy group. These disazo-dyestuffs are obtained according to the invention by coupling tetrazotized 4:4′-diaminodiphenyl compounds of the formula (2)
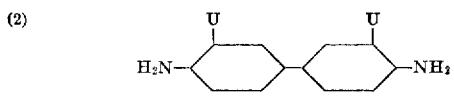

on both sides with azo components of the formula (3)
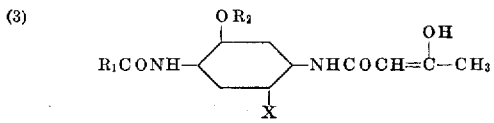

in which formula X, $R_1CO$, $R_2$ and U have the meaning given above.

The tetrazo compounds of the diamines of the Formula 2 are coupled on both sides with azo components of the Formula 3, the coupling of both diazotized amino groups being advantageously with the same azo components. The low molecular alkoxy groups present in the azo components can be, for example, ethoxy groups or advantageously methoxy groups. The halogen atoms present as further substituents in the azo components can be bromine or preferably chlorine atoms.

The azo components correspond advantageously to one of the formulae (4)
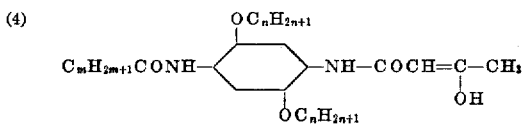

and
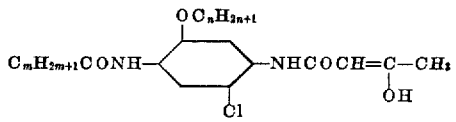

in which m and n are whole numbers of a maximum of 2. Thus, for example very valuable disazo dyestuffs are obtained from 1 - acetoacetylamino - 2,5 - dimethoxy - 4- acetylaminobenzene and 1-acetoacetylamino-2-chloro-4-acetylamino-5-methoxybenzene.

The tetrazotization of the diaminodiphenyl compounds can take place in the conventional manner, advantageously by means of hydrochloric acid and alkali nitrite. It is to be recommended as a rule to filter the solutions of the tetrazo compounds from any insoluble impurities.

The coupling of the resulting tetrazo compounds with the azo components of the specified type can take place, if desired, upon a substratum, for example, upon cellulosic materials, impregnated with azo components of the Formula 3. However, this coupling takes place with especial advantage in substance. In the latter case, the coupling is advantageously carried out in a weakly acid, for example acetic acid medium, it being in general of value to add a wetting or dispersing agent to the coupling mixture. For this purpose wetting and dispersing agents of both ionogenic and non-ionogenic type can be used. As a dispersing agent of ionogenic type, Turkey red oil can, for example, be used, and as dispersing agents of non-ionogenic type there may be mentioned polyglycol ethers or high molecular fatty alcohols.

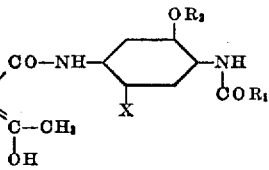

The new disazo-dyestuffs of the above Formula 1, when produced in substance, are valuable pigments and as a rule are distinguished by very good fastness to light, good fastness to migration (bleeding out) and in addition by temperature stability and stability to solvents. This is of value, for example, for the so-called pigment printing, i. e. for printing processes which depend upon fixing pigments by means of suitable adhesives such as casein, hardenable artificial resins, especially urea- or melamine-formaldehyde condensation products, polyvinyl chloride or polyvinyl acetate solutions or emusions, or other emulsions (for example oil-in-water or water-in-oil emulsions) upon a substratum, especially upon a textile fiber or also upon other sheet material, such as paper (for example wallpaper) or glass fiber fabrics. The new pigments can also be used for other purposes, for example in finely divided form for the dyeing of artificial silk from viscose or cellulose ethers and esters or from superpolyamides or superpolyurethanes, the pigment being added to the spinning mass, or also for the manufacture of colored lacquers or lacquer base materials, solutions and products from acetylcellulose, nitrocellulose, natural resins or artificial resins, such as polymerisation or condensation resins, for example aminoplasts, phenoplasts, polyvinyl chloride, polystyrene, polyethylene, polyacryl, rubber, casein, silicone and silicone resins, the pigments being eminently suited to these purposes. They can also be used with advantage for the manufacture of colored pencils, cosmetic preparations or sheets for lamination purposes.

The new dyestuffs can normally be incorporated easily into masses or preparations of the specified types and this

3 incorporation is advantageously effected at a stage before these masses or preparations have assumed their final form. The necessary shaping operations, such as spinning, pressing, hardening, casting, lamination and so on can also be carried out in the presence of the pigments concerned without detriment to any necessary subsequent chemical reaction of the substratum, such as further polymerisation or condensation.

The following examples illustrate the invention, the parts being by weight unless otherwise stated and the relation between part by weight and part by volume being the same as that between the kilogram and the liter:

Example 1

Into an acetic acid suspension of 61.2 parts of 1-acetoacetylamino-2-chloro-4-acetylamino-5-methoxybenzene to which a dispersing agent, for example Turkey red oil, has been added, there is run a solution of 25.3 parts of tetrazotized 3:3'-dichloro-4:4'-diaminodiphenyl. By addition of sodium acetate, the pH value of the coupling liquid is adjusted to 4.5 to 5, and the temperature is allowed to rise to 20° C. whereby the dyestuff formation is soon completed. Then the whole is filtered with suction and the pigment thoroughly washed with warm water and dried. The dyestuff gives, for example in pigment printing, an orange of very good fastness properties, especially of excellent stability to solvents.

By using instead of 3:3'-dichloro-4:4'-diaminodiphenyl 21.2 parts of 3:3'-dimethyl-4:4'-diaminodiphenyl or 24.4 parts of 3:3'-dimethoxy-4:4'-diaminodiphenyl, an orange is obtained of which the color tint is displaced more towards red but which has similar properties primarily suitable for pigment printing and the coloring of lacquers.

Example 2

A tetrazo solution from 21.2 parts of 3:3'-dimethyl-4:4'-diaminodiphenyl is run under the surface of an acetic acid suspension of 60.3 parts of 1-acetoacetylamino-2:5-dimethoxy-4-acetylaminobenzene. At the same time as the introduction of the tetrazo solution, an aqueous solution of a dispersing agent, for example oleolyl polyglycol ether, is run into the reaction mixture. The temperature is maintained at 0–5° C. After the introduction of the tetrazo solution, the pH value of the coupling suspension is adjusted to 4:5 to 5 and the whole is slowly heated to 30° C. whereby the dyestuff formation is completed. The pigment, isolated as in Example 1, when ground in a plasticizer, for example dioctyl phthalate, gives a fine paste which colors polyvinyl chloride foils in orange tints of good fastness to light.

By using instead of 3:3'-dimethyl-4:4'-diaminodiphenyl 25.3 parts of 3:3'-dichloro-4:4'-diaminodiphenyl and proceeding otherwise as described in the above example, a yellow dyestuff is obtained of similar properties.

Example 3

A mixture is prepared from 276 parts of the diazoamino compound from tetrazotized 3:3'-dichloro-4:4'-diaminodiphenyl and methyl-taurin prepared in the usual manner
300 parts of acetoacetyl-amino-2-chloro-4-acetylamino-5-methoxybenzene
10 parts of sodium butylnaphthalene sulfonate
414 parts of sodium chloride or urea 1000 parts By means of this preparation fabrics of cellulosic fibers can, for example, be printed as follows: From 50 parts of the printing preparation
30 parts of Turkey red oil
290 parts of water
30 parts of a sodium hydroxide solution of 30 percent strength
600 parts of a neutral thickening mixture of starch and tragacanth 1000 parts a printing paste is prepared. A fabric of native or regenerated cellulose is printed with this paste in the usual manner, for example roller printing or screen printing. The printed material is then dried, steamed for five minutes in the presence of an acid, for example formic acid and soaped at the boil as usual. Golden orange printing designs having good fastness properties are obtained.

Example 4

65 parts of polyvinyl chloride, 35 parts of dioctylphthalate and 0.5 part of the dyestuff obtainable according to Example 1 are stirred together and the mixture obtained is thereupon passed to and fro for about 3 minutes at 140 to 145° C. between the two rolls of a calender. A yellow colored foil is obtained of strong color tint, very good fastness to light and good fastness to migration.

What is claimed is:

1. A disazo-dyestuff which is free from water solubilizing groups and corresponds to the formula

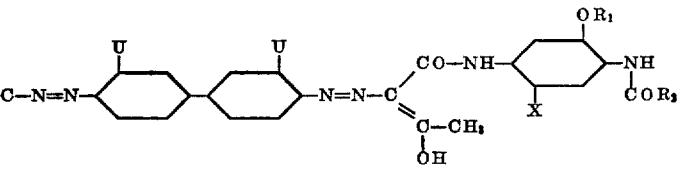

in which R₁CO— represents the radical of a low molecular aliphatic carboxylic acid, R₂ represents a low molecular alkyl group, X represents a member selected from the group consisting of a chlorine and a low molecular alkoxy group, and U represents a member selected from the group consisting of a chlorine atom, a methyl group and a low molecular alkoxy group.

2. A disazo-dyestuff of the formula

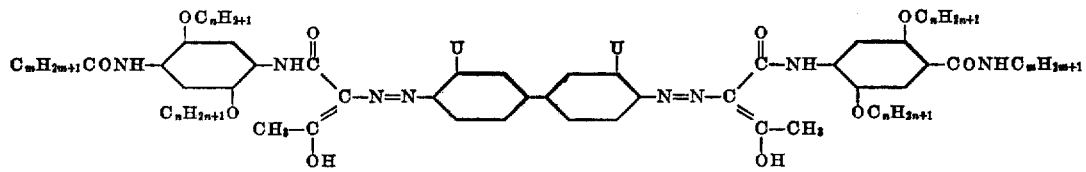

in which U represents a member selected from the group consisting of a chlorine atom, a methoxy and a methyl group, m and n are whole numbers of at the most 2.

3. A disazo-dyestuff of the formula

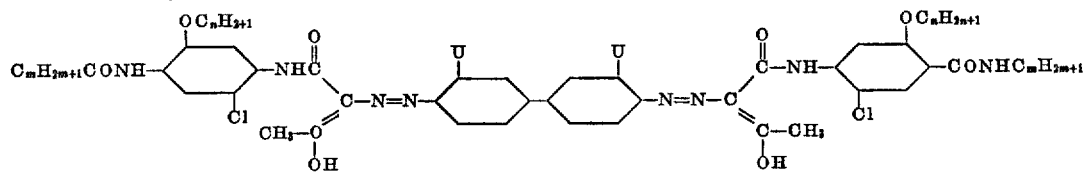

in which U represents a member selected from the group consisting of a chlorine atom, a methoxy and a methyl group, m and n are whole numbers of at the most 2.

4. The disazo-dyestuff of the formula

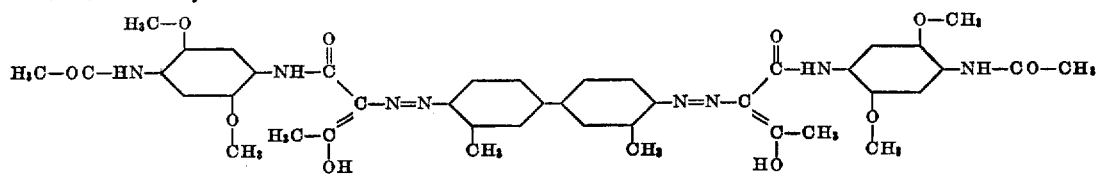

5. The disazo-dyestuff of the formula

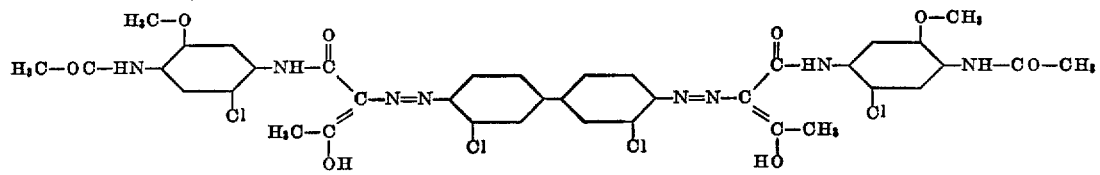

6. The disazo-dyestuff of the formula

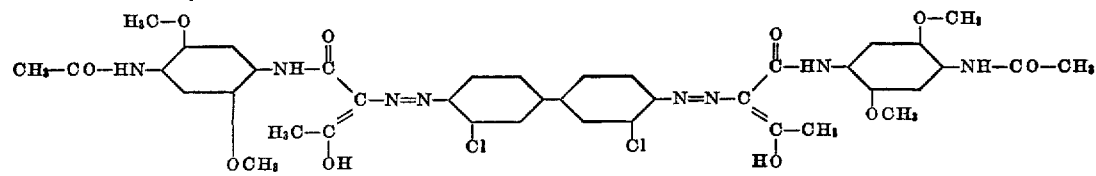

References Cited in the file of this patent

UNITED STATES PATENTS

| | | |
|---|---|---|
| 1,932,577 | Eichwede et al. | Oct. 31, 1933 |
| 2,361,566 | Reynolds | Oct. 31, 1944 |
| 2,361,567 | Reynolds | Oct. 31, 1944 |
| 2,739,146 | Weigele et al. | Mar. 20, 1956 |

UNITED STATES PATENT OFFICE
Certificate of Correction

Patent No. 2,807,609 September 24, 1957

Jacob Danuser et al.

It is hereby certified that error appears in the printed specification of the above numbered patent requiring correction and that the said Letters Patent should read as corrected below.

Column 3, line 56, for "4:5 to 5" read —4.5 to 5—; column 4, claim 1, the extreme right-hand portion of the formula should read as shown below instead of as in the patent—

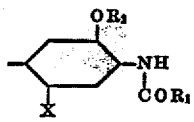

Signed and sealed this 11th day of February 1958.

[SEAL]

Attest:
KARL H. AXLINE,
Attesting Officer.

ROBERT C. WATSON,
Commissioner of Patents.